No. 885,205. PATENTED APR. 21, 1908.
T. D. ULRICH.
ICE CLEAT FOR TRACTION WHEELS.
APPLICATION FILED FEB. 21, 1907.
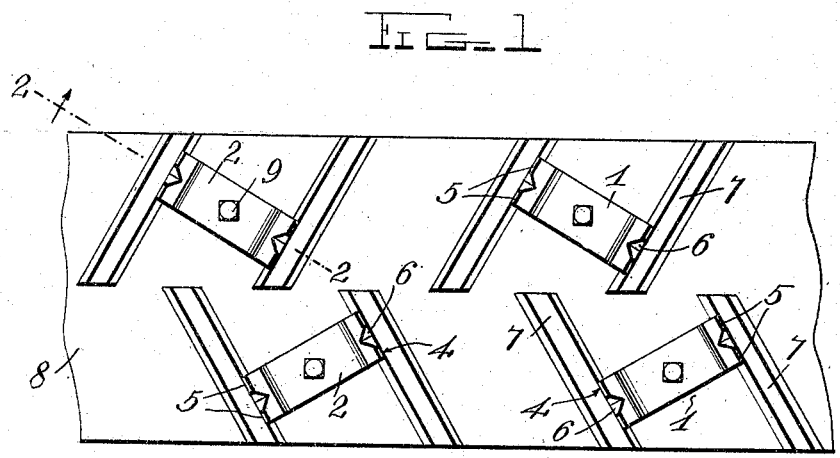
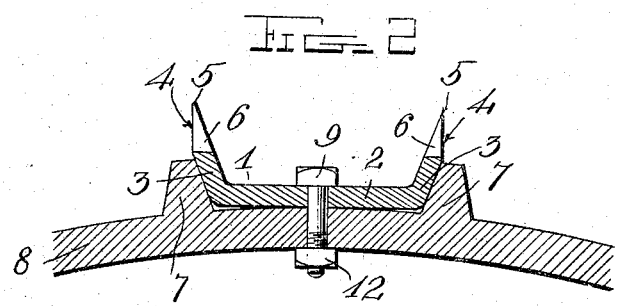
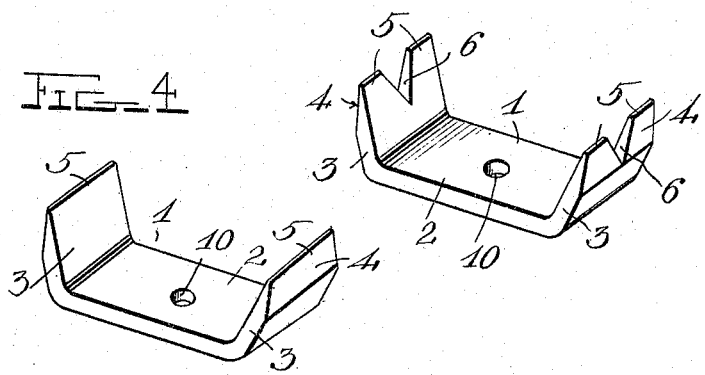
Witnesses
Inventor
Tomey D. Ulrich
by H. B. Willson & Co.
Attorneys

UNITED STATES PATENT OFFICE.

TOMEY D. ULRICH, OF MARION, OHIO.

ICE-CLEAT FOR TRACTION-WHEELS.

No. 885,205.   Specification of Letters Patent.   Patented April 21, 1908.

Application filed February 21, 1907. Serial No. 358,747.

*To all whom it may concern:*

Be it known that I, TOMEY D. ULRICH, a citizen of the United States, residing at Marion, in the county of Marion and State of Ohio, have invented certain new and useful Improvements in Ice-Cleats for Traction-Wheels; and I do declare the following to be a full, clear, and exact description of the invention, such as will enable others skilled in the art to which it appertains to make and use the same.

This invention relates to improvements in detachable ice and snow cleats for traction wheels.

The object of the invention is to provide a cleat of this character adapted to be secured to the rim of a traction wheel to fit closely between the ordinary traction cleats thereon whereby the wheel may obtain a firm hold on snow or ice when passing over the same.

A further object is to provide an ice cleat for traction wheels which may be readily removed from or replaced on the wheel when desired, thus enabling the cleats to be taken off and sharpened or put in order when necessary.

With the foregoing and other objects in view, the invention consists in certain novel features of construction, combination and arrangement of parts, as will be hereinafter fully described and claimed.

In the accompanying drawings, Figure 1 is a plan view of a portion of the traction wheel showing the application of the invention thereto; Fig. 2 is a detail sectional view o: the line 2—2 of Fig. 1; and Fig. 3 is a detail perspective view of one of the cleats removed from the wheel. Fig. 4 is a similar view of a modified form of the cleats.

Referring more particularly to the drawings 1 denotes a cleat which consists of a flat base portion 2 which is preferably rectangular in shape. The ends 3 of the base portion 2 are bent outwardly at an inclination as shown. The ends 3 are beveled as at 4 to form sharp ice and snow engaging edges 5. The beveled outer edges of the ends 3 are provided with centrally-disposed plain or V-shaped notches 6 which divides the edges into spurs which greatly facilitates the engagement of the edges with ice or snow over which the wheel passes.

The base portion 2 is preferably formed of such length as to fit snugly between the ordinary traction cleats 7 of the wheel, the inclination of the ends 3 being preferably such as to engage or fit against the inclined or beveled edges of the cleats 7, said cleats 7 thereby assisting in holding the ice cleats in position.

The cleats 1 are detachably secured to the rim 8 of the wheel in any suitable manner, the same being here shown as detachably connected to the rim by means of the bolt 9 which is passed through the bolt hole 10 formed in the center of the base portion 2 of the cleat and through an alined hole in the rim 8 of the wheel. A nut 12 is screwed on to the inner end of the bolt 9 and against the inner side of the wheel rim thereby securely clamping the cleat on to the rim. By forming the cleat 1 to fit between the ordinary traction cleats of the wheel, but one bolt is required to secure the same in place, said traction cleats preventing said ice cleat from turning on the bolt.

In Fig. 4 of the drawings, is shown a modified form of the cleat 1, in this instance the V-shaped notch 6 is omitted so that the sharp beveled edges 5 of the outwardly bent ends of the cleat form only a single ice engaging spur on each end of the cleat. Thus it will be obvious that I may form the cleat with two or more ice engaging spurs as may be desired.

From the foregoing description, taken in connection with the accompanying drawings, the construction and operation of the invention will be readily understood without requiring a more extended explanation.

Various changes in the form, proportion and the minor details of construction may be resorted to without departing from the spirit or sacrificing any of the advantages of the invention, as defined by the appended claims.

Having thus described my invention, what I claim as new and desire to secure by Letters Patent, is:—

An ice and snow cleat for traction wheels comprising a flat rectangular base portion, and outwardly-projecting inclined, beveled ends adapted to fit between and to be held in position by the traction cleats of said wheel, the inclined beveled ends of said cleats having therein a V-shaped notch to form ice and snow engaging spurs and a fastening bolt and nut adapted to be applied to said cleats to removably secure the same to the rim of the wheel, substantially as described.

In testimony whereof I have hereunto set my hand in presence of two subscribing witnesses.

TOMEY D. ULRICH.

Witnesses:
CHARLES F. SMITH,
DANIEL W. STRAYER.